(12) United States Patent
Justus

(10) Patent No.: US 9,661,953 B2
(45) Date of Patent: May 30, 2017

(54) MILL

(71) Applicant: Riensch & Held GMBH & Co. KG, Hamburg (DE)

(72) Inventor: Christian Justus, Hamburg (DE)

(73) Assignee: RIENSCH & HELD GMBH & CO., Hamburg (DE)

( * ) Notice: Subject to any disclaimer, the term of this patent is extended or adjusted under 35 U.S.C. 154(b) by 102 days.

(21) Appl. No.: 14/429,441

(22) PCT Filed: Jul. 3, 2013

(86) PCT No.: PCT/EP2013/064077
§ 371 (c)(1),
(2) Date: Mar. 19, 2015

(87) PCT Pub. No.: WO2014/053255
PCT Pub. Date: Apr. 10, 2014

(65) Prior Publication Data
US 2015/0208867 A1    Jul. 30, 2015

(30) Foreign Application Priority Data

Oct. 2, 2012  (DE) .................. 20 2012 009 427 U

(51) Int. Cl.
*A47J 42/40*    (2006.01)
*A47J 42/00*    (2006.01)

(52) U.S. Cl.
CPC ............. *A47J 42/40* (2013.01); *A47J 42/00* (2013.01)

(58) Field of Classification Search
CPC .................................. A47J 42/40; A47J 42/00
(Continued)

(56) References Cited

U.S. PATENT DOCUMENTS

2010/0276527 A1 * 11/2010 Park .................. A47J 42/08
241/169.1

FOREIGN PATENT DOCUMENTS

CN        1565334        1/2005
DE      201404197        5/2001
(Continued)

OTHER PUBLICATIONS

International Search Report and Written Opinion dated Aug. 23, 2013 from PCT Application No. PCT/EP2013/064077, 10 pages.

*Primary Examiner* — Mark Rosenbaum
(74) *Attorney, Agent, or Firm* — Hollingsworth Davis, LLC

(57) ABSTRACT

An aroma granulate mill for dispensing ground aroma granulate, particularly a spice mill for dispensation of ground spices, such as salt and pepper, comprising a container for accepting unground, coarse aroma granulate, an element provided at the container having a dispensation opening for dispensing ground, fine-grained aroma granulate, and a grinder arranged upstream to the dispensation opening for milling the unground, coarse aroma granulate into ground, fine-grained aroma granulate is provided. The element includes the dispensation opening having a concave collar, which forms a cavity open towards the outside, which has a circumferential side wall and comprises at least one section recessed in reference to the circumferential side wall in the direction towards the container, in which the dispensation opening is arranged, with the circumferential side wall defining an opening, with its area being smaller than the cross-section of the opening of the cavity at its widest section.

19 Claims, 7 Drawing Sheets

Figure 1:
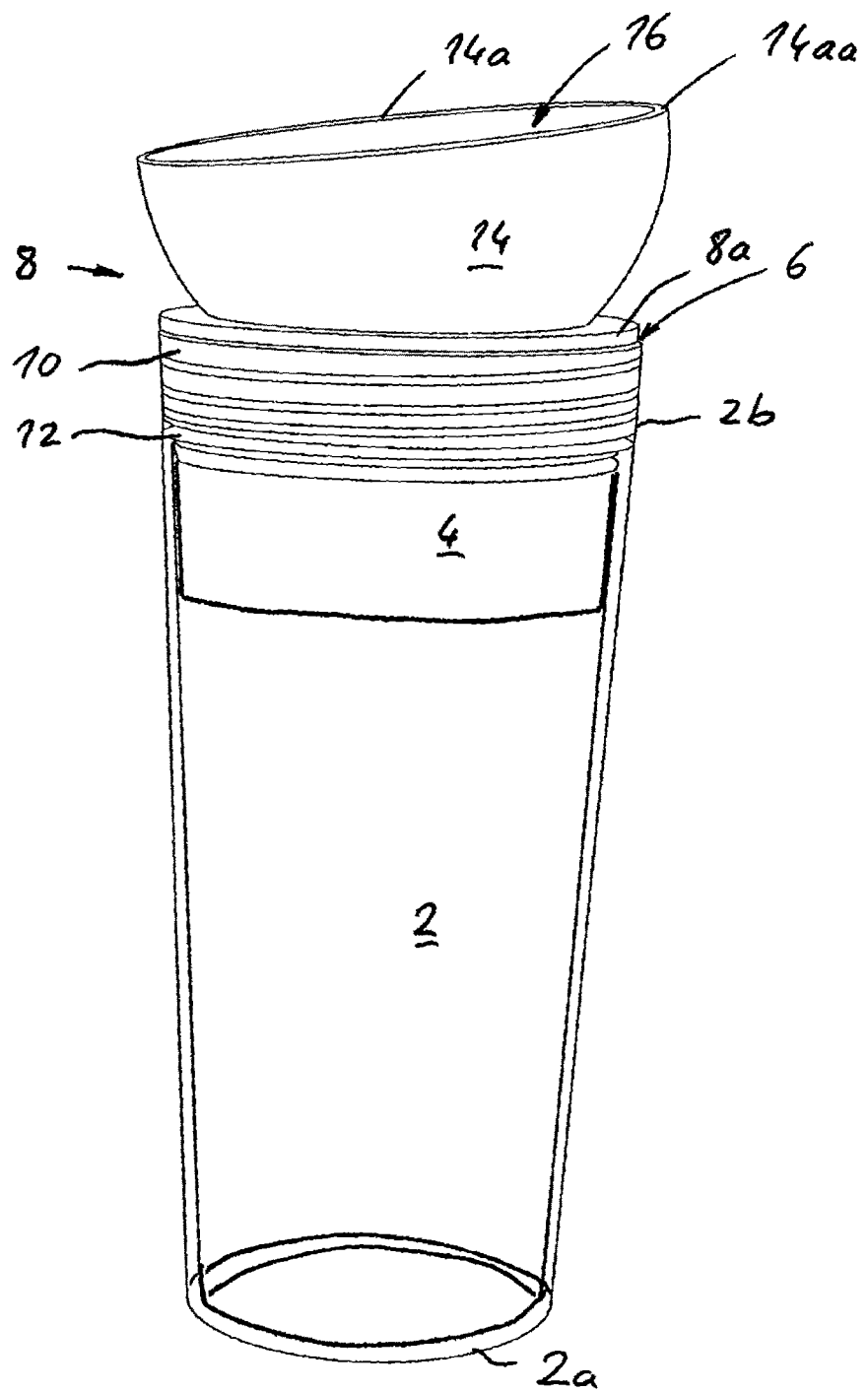

(58) Field of Classification Search
USPC .................................................. 241/169.1
See application file for complete search history.

(56) References Cited

FOREIGN PATENT DOCUMENTS

| | | |
|---|---|---|
| DE | 10035390 C1 | 12/2001 |
| DE | 202006001986 U1 | 5/2006 |
| DE | 102005032285 | 1/2007 |
| DE | 202011100534 | 8/2011 |
| WO | WO 2012022118 | 2/2012 |

* cited by examiner

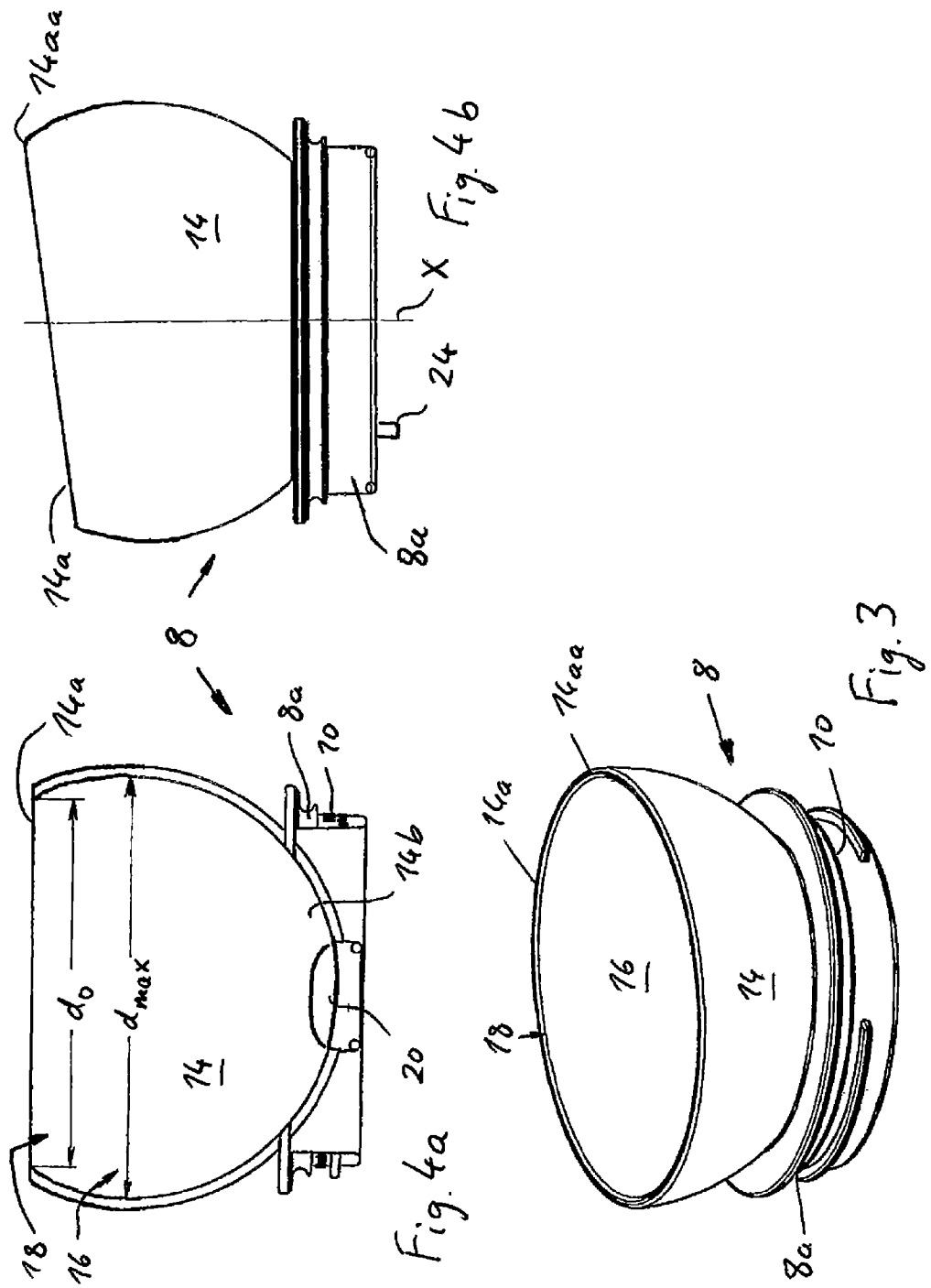

MILL

The invention relates to an aroma granulate mill to dispense ground aroma granulate, particularly a spice mill for the dispensation of ground spices, such as salt or pepper, comprising a container to accept unground, coarse aroma granulate, an element provided at said container showing a dispensation opening for dispensing ground, fine-grained aroma granulate from the container, and a grinder arranged upstream in reference to the dispensation opening for milling the unground, coarse aroma granulate into ground, fine-grained aroma granulate. Such aroma granulate mills are particularly used as salt and pepper mills. In prior art salt or pepper mills are known in which the grinder is arranged at the bottom of the container and the bottom is provided with a dispensation opening, which is connected to the outlet of the grinder or forms the outlet of said grinder. The container accepts salt or peppercorns as unground, coarse aroma granulate, which is processed by the grinder into fine-grained salt or fine-grained pepper, which therefore represents milled, fine-grained aroma granulate, which is then dispensed through the dispensation opening in the bottom of the container for the further application in food and the like. For this purpose, common rotationally operating grinders are used, which are either driven by an electric motor or operated manually by a rotary knob being twisted, located at the top, which is distanced from the bottom, with the rotary motion of the rotary knob being transmitted to and/or into the grinder through the container via a rod extending approximately in the middle. In another embodiment of salt or pepper mills of prior art the grinder is however arranged in the area of the top of the container and thus in direct proximity of the rotary knob also located there, so that between the rotary knob and the grinder an essentially direct engagement occurs. In order to dispense the ground fine-grained aroma granulate, in this embodiment the top of the container is accordingly open and/or provided with an opening and the rotary knob shows a penetrating opening as the dispensation opening, which communicates with the outlet of the grinder exposed at the opening in the top of the container.

Such conventional aroma granulate mills are however disadvantageous with regards to their handling. For example, a precise dosing is generally impossible. In particular, the dosing during the grinding process cannot be controlled at all. Only after the dispensation and an already occurred application of the ground, fine-grained aroma granulate the user can see if the desired dosage was or was not correct. Here, a control of the dosage can only be performed subsequently, with then particularly in case of an undesired overdose any subsequently correction being excluded. In case of an insufficient dosage, here subsequent dosing can be performed by a renewed operating of the grinder, however such a subsequent dosing suffers the same, above-described problems as the previous (primary) dosing.

The objective of the present invention is to improve the aroma granulate mill of the type mentioned at the outset such that it can be handled more easily and particularly allows a targeted dosing.

This objective is attained in an aroma granulate mill for the dispensation of ground aroma granulate, particularly a spice mill for the dispensation of ground spices, such as salt or pepper, comprising a container for accepting unground, coarse aroma granulate, an element provided at the container showing a dispensation opening for dispensing ground, fine-grained aroma granulate from the container, and a grinder arranged upstream in reference to the dispensation opening for milling the unground, coarse aroma granulate into ground, fine-grained aroma granulate, characterized in that the element comprising the dispensation opening shows a concave collar, which forms a cavity open towards the outside, which is limited by a circumferential lateral wall and shows at least one section recessed in the direction towards the container opposite the circumferential lateral wall, in which the dispensation opening is arranged, with the circumferential lateral wall defining an opening, with its area being smaller than the cross-section of the opening of the cavity at its widest section.

By the use of a concave collar according to the invention, which forms a cavity open towards the outside, with the dispensation opening being arranged inside thereof, the material, prior to dispensing and applying it, already present as fine-grained aroma granulate can be easily and particularly precisely controlled with regards to its dosage. This is achieved according to the invention such that after processing by the grinder and being discharged through the dispensation opening the ground material is first collected in the concave collar of the cavity open towards the outside, because according to the invention the dispensation opening inside this cavity is provided at a point located lower. This way the ground material cannot only be seen but also focused, since it can be concentrated at the lowermost point inside the concave collar, which subsequently allows a more targeted application and/or dispensation. This in turn leads to a precise dosing, since particularly by a slight vibration of the concave collar extremely precisely and in a targeted fashion a subset of the ground material collected in the cavity can be dispensed in the desired dosage from the concave collar. Any potentially excess quantity of ground material can be returned through the dispensation opening back into the container, if necessary, with here for example the concave collar once more being subjected to slight vibrations, in order to for the ground material becoming fluid and/or remaining fluid. However, in case of insufficient dosage by way of continued operation of the grinder additional ground material can be transported through the dispensation opening into the cavity of the concave collar until the desired dosage is reached. Accordingly, the concave collar according to the invention shows the combined effect of an interim storage container and a spreader and thus the element comprising the dispensation opening with the concave collar can alternatively also be called a concave spreader. In this context it should additionally be mentioned that a grinder of prior art may be used for the aroma granulate mills according to the invention, such as already operating in salt and pepper mills of prior art, for example.

Due to the fact that the circumferential lateral wall defines an opening, with its area being smaller than the cross-section of the opening of the cavity at its widest section inside the concave collar, the cavity widens between the dispensation opening near the container and the opening defined by the circumferential lateral wall distanced from the container, thus forms a kind of bulge, with its cross-sectional opening being greater than the area of the opening defined by the circumferential lateral wall, and thus narrows towards the opening defined by the circumferential lateral wall. Providing the concave collar with such a bulging form and a smaller opening, for example like a modern red wine glass, shows the advantage that even at greater tipping angles the presence of the ground material dispensed by the grinder through the dispensation opening remains securely inside the cavity of the concave collar. Accordingly, with such a design the dispensation of the ground material can be optimized from the cavity of the concave collar.

According to another aspect of the present invention the above-stated objective is attained in an aroma granulate mill for the dispensation of ground aroma granulate, particularly a spice mill for the dispensation of ground spices, such as salt or pepper, comprising a container for the acceptance of unground, coarse aroma granulate, an element provided at the container, showing a dispensation opening for dispensing ground, fine-grained aroma granulate out of the container, and a grinder arranged upstream in reference to the dispensation opening for milling the unground, coarse aroma granulate into ground, fine-grained aroma granulate, characterized in that the element comprising the dispensation opening shows a concave collar, which forms a cavity open towards the outside, with the dispensation opening being arranged therein. Preferred embodiments and advantageous further developments of the invention are disclosed in the dependent claims.

In a preferred embodiment the circumferential lateral wall is essentially located in one level. This way it is possible to place the aroma granulate mill with the circumferential lateral wall on an essentially flat underground. In a further development the level can be arranged inclined in reference to the container. When the container is essentially embodied as a rotary body the level may be arranged inclined in reference to the axis of rotation and/or the central axis of the rotary body. Based on this asymmetric and/or uneven design of the concave collar here a point or an area develops on the circumferential lateral wall, which is located farthest away from the dispensation opening and thus quasi "at the highest point", thus resulting in the dispensation of the ground material from the cavity of the concave collar being optimized as well.

Preferably the concave collar shows an essentially partially spherical or partially parabolic form. Concretely, the concave collar may show the form of a bowl for example essentially facing away from the container. In general, other forms are also possible, if they show a curvature or bulging inwardly in the direction towards the container.

In another preferred embodiment the container shows an opening, which can be closed by an attachment, formed by the element comprising the dispensation opening. This embodiment is advantageous in that the element comprising the dispensation opening, which according to the invention is provided with a concave collar or is made therefrom, serves not only for dispensing the ground material in the assembled state, but also allows a filling of the container with new, unground, coarse aroma granulate in the disassembled and/or open state, and thus simultaneously also shows the function of a lid as well.

Here, beneficially the grinder shall be arranged in the area of the opening of the container so that, when the attachment is mounted, a connection is generated between the outlet of the grinder and the dispensation opening.

Another embodiment of the invention, in which the grinder shows a mobile operating section and can be set into the grinding operation by the movement of this operating section, is characterized in that the attachment comprises an engagement section, which can be brought into an engagement with the operating section of the grinder so that the operating section of the grinder is set in motion by a relative motion between the container and the attachment. This embodiment targets the use of a grinder operated manually by a user. For this purpose, similar to aroma granulate mills of prior art, in particular the container can be held with the hands and the attachment can be rotated in reference to the container by an appropriate manual operation. Alternatively, it is also possible to hold the attachment and to rotate the container in reference to said attachment, which is particularly advantageous when the concave collar shows an asymmetrical or uneven shape and for an optimal dispensation of the ground material the concave collar shall be held in a certain alignment. Here it is only relevant for the activation of the grinder that a relative motion occurs between the container and the attachment in order to generate an engagement of the engaging section provided at the attachment with the operating section of the grinder. Preferably the engaging section at the attachment can be embodied as a pin-shaped tappet, for example, which projects in the direction towards the grinder and can be brought into contact with the operating section in order to entrain it when it is in motion.

A further development, in which the operating section of the grinder and the attachment are supported in a rotational fashion, is characterized in that during a relative rotary motion between the container and the attachment the engaging section is subjected to a motion along a circular path in order to transfer the relative rotary motion of the attachment in reference to the container to the operating section of the grinder.

Beneficially the grinder should be embodied such that it is respectively set into grinding operation during the rotation of its operating section in both directions. This way, the grinder can be operated by a relative back and forth motion and/or a reciprocal rotary motion of the attachment and the container in reference to each other, allowing to implement a particularly easy handling of the aroma granulate mill.

Preferably the attachment is embodied such that, when it is arranged on or in the opening of the container, the axis of rotation of the attachment approximately coincides with the axis of rotation of the operating section of the grinder. If the container is essentially embodied as a rotary body, beneficially the axis of rotation of the operating section of the grinder should essentially coincide with the axis of rotation or the central axis of the rotary body.

Another preferred embodiment, in which the grinder comprises an operating section supported rotationally or in a mobile fashion along a circular path and can be set into a milling operation by the motion of this operating section, is characterized in that the collar is supported rotational by a section of the attachment and shows an engagement section, which can be made to engage the operating section of the grinder such that during a relative rotary motion between the collar and the section of the attachment the engagement section is subjected to a motion along a circular path in order to transfer this relative rotary motion to the operating section of the grinder. Thus, this embodiment offers the option that, based on a relative rotary motion between the collar and the other section of the attachment, the grinder is set into the milling operation. Alternatively it is also possible to arrange the grinder at or in the attachment. In a preferred further development of this embodiment the collar can be supported rotationally at a section of the attachment and be coupled to the grinder such that the grinder can be set into the milling operation by a relative rotary motion between the collar and the other section of the attachment.

In order to protect the container from any moisture penetrating or any unintended discharge of remaining ground material from the collar, particularly in the idle state, as well as to prevent any potential soiling resulting therefrom it should be possible to seal the cavity and/or the dispensation opening with a lid.

Finally, the container may be provided with a bottom, arranged distanced from the concave collar, by which it can be placed onto an underground. This embodiment therefore allows to put the container with the concave collar pointing upwards, which among other things is advantageous in that any residual amounts of ground material still present in the cavity of the concave collar is not spilled and thus not wasted but remains in the concave collar and is stored here, or if necessary can also be returned back into the container through the dispensation opening. Additionally or alternatively it is also possible, based on the description of an above-mentioned exemplary embodiment, to embody the concave collar such that a placement of the aroma granulate mill with the concave collar on the underground is possible, quasi "upside down".

Figure 2:
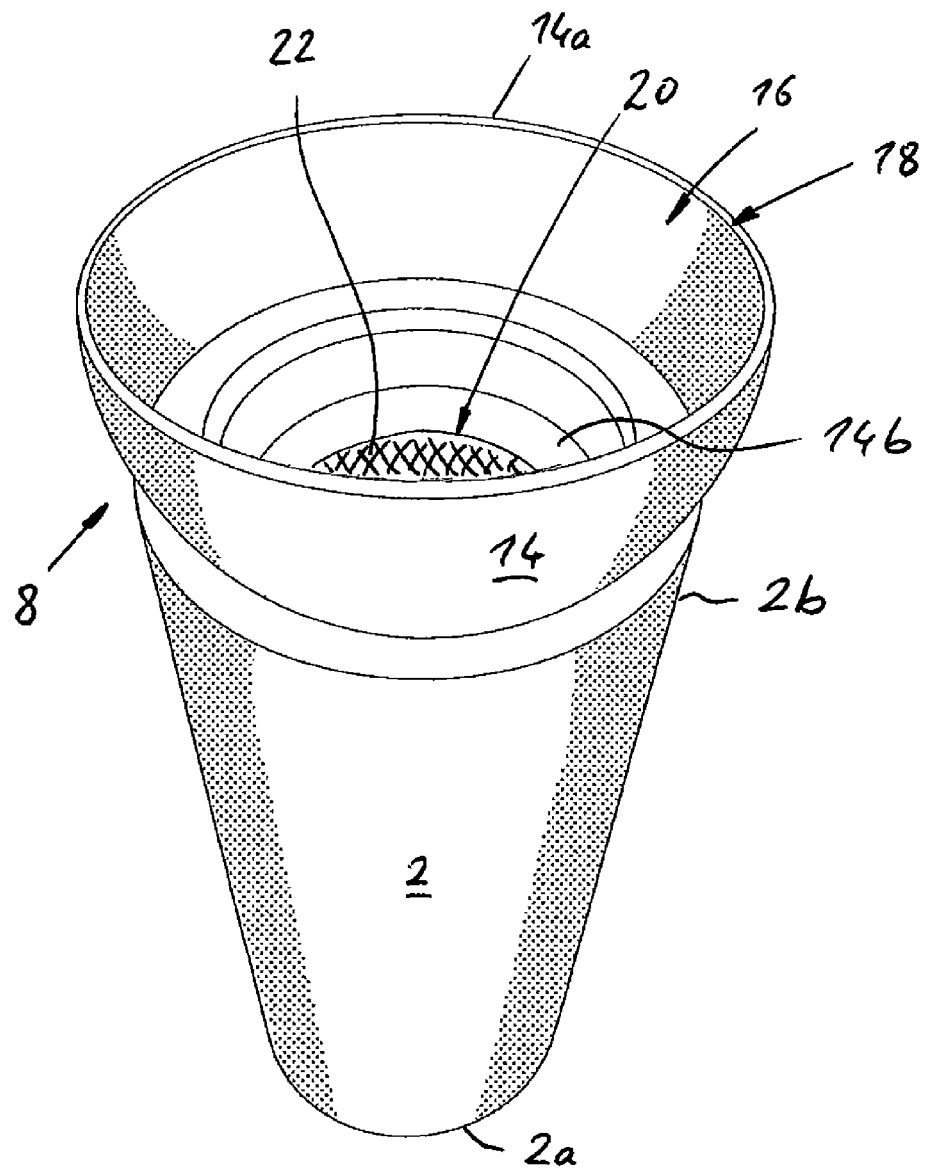
Figure 5:
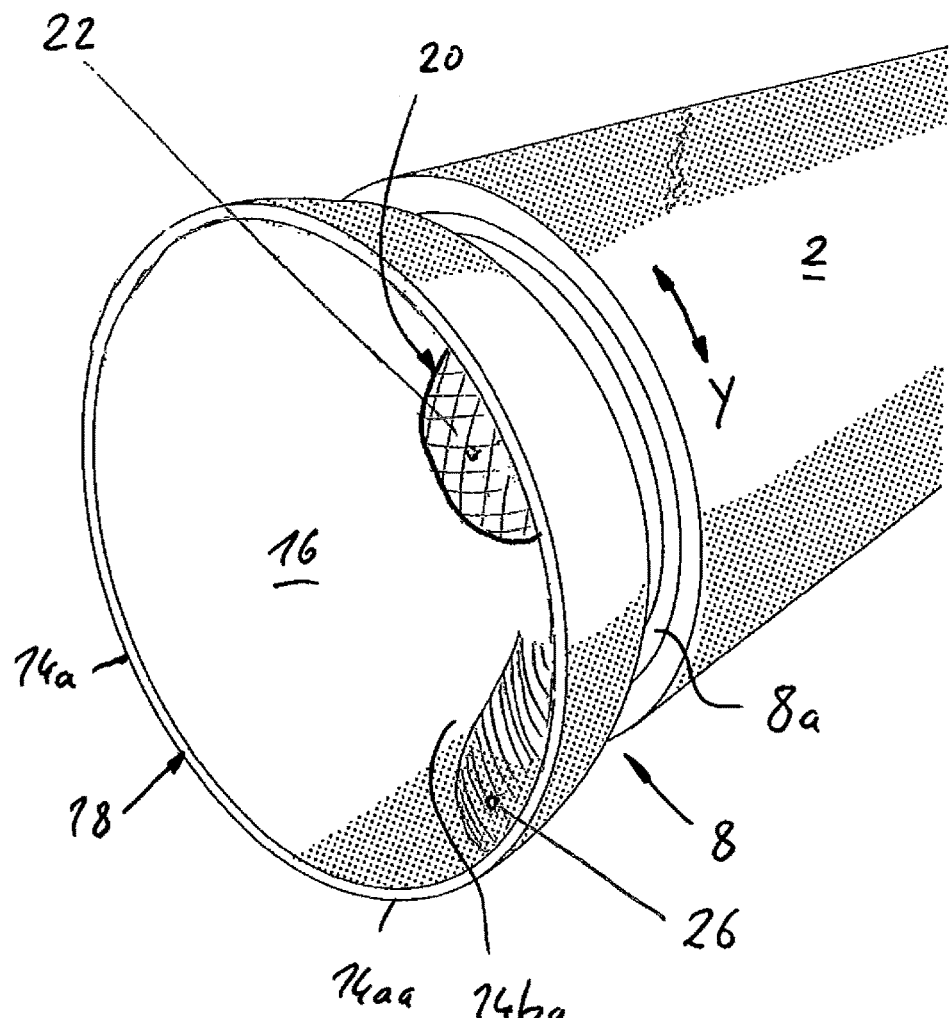
Figure 6:
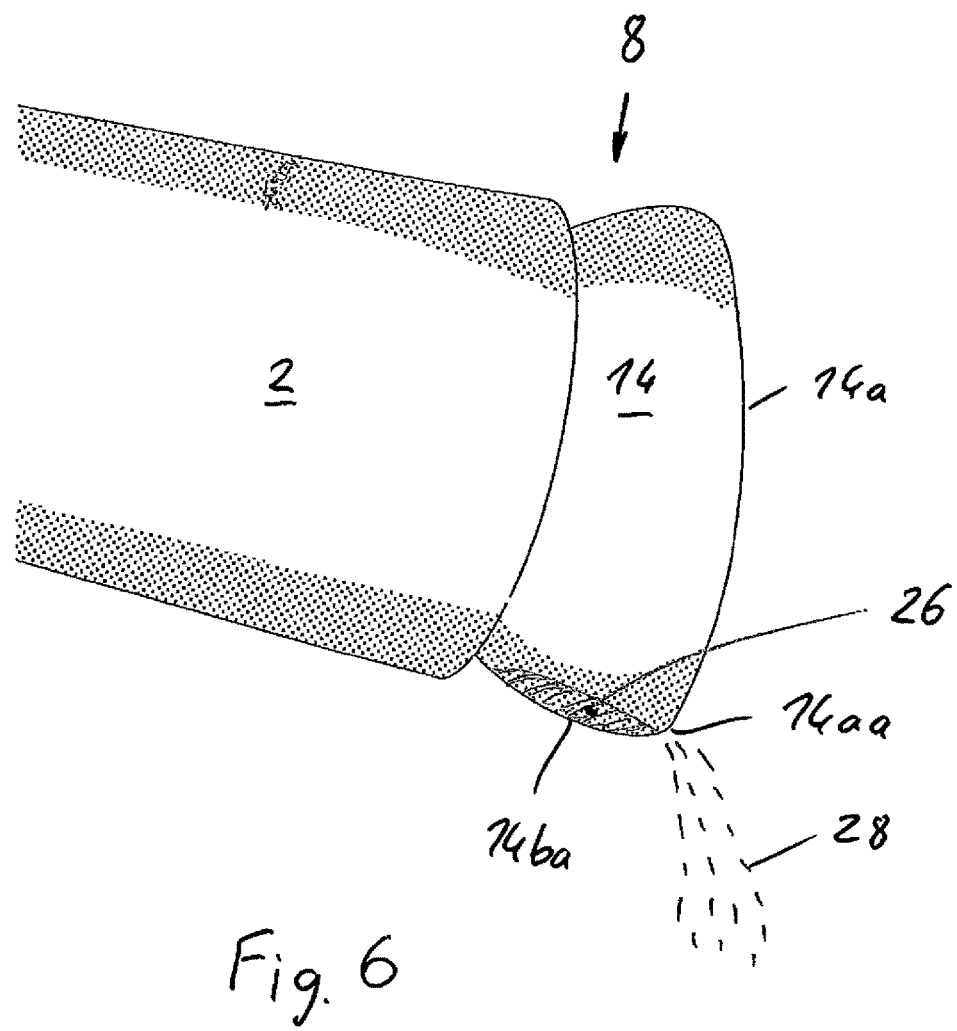
Figure 7:
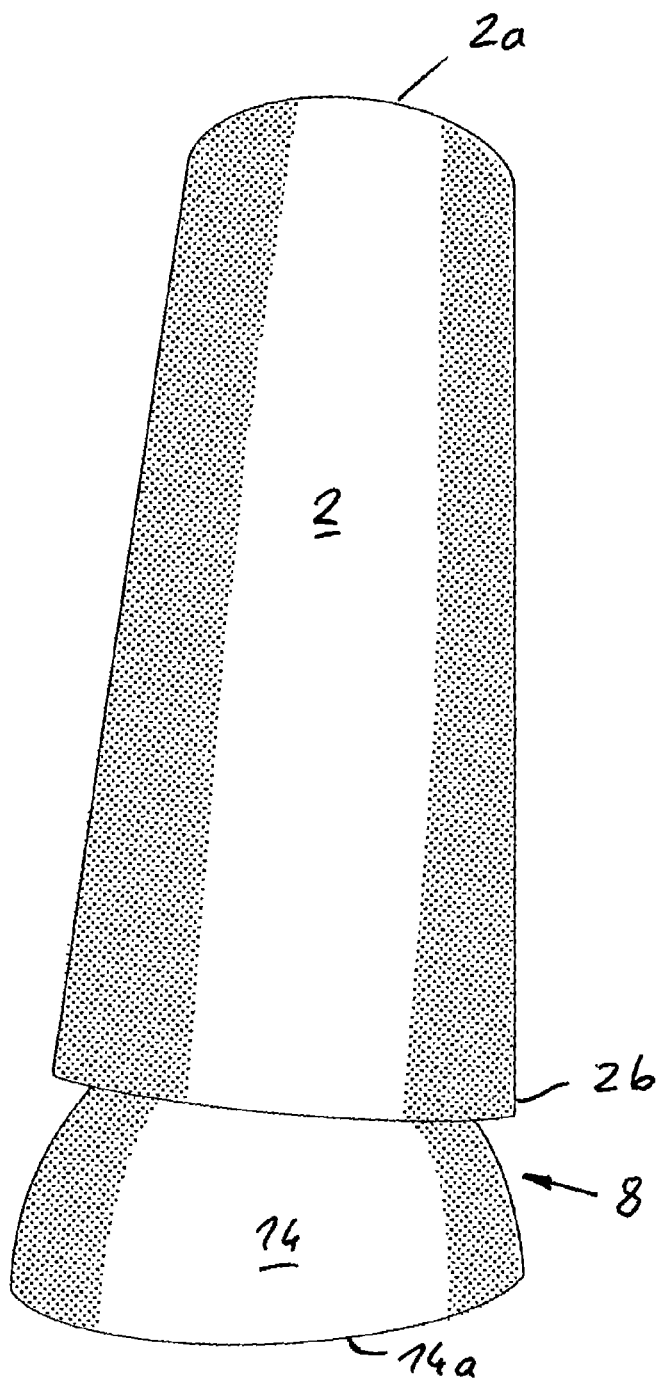
Figures 8, 9:
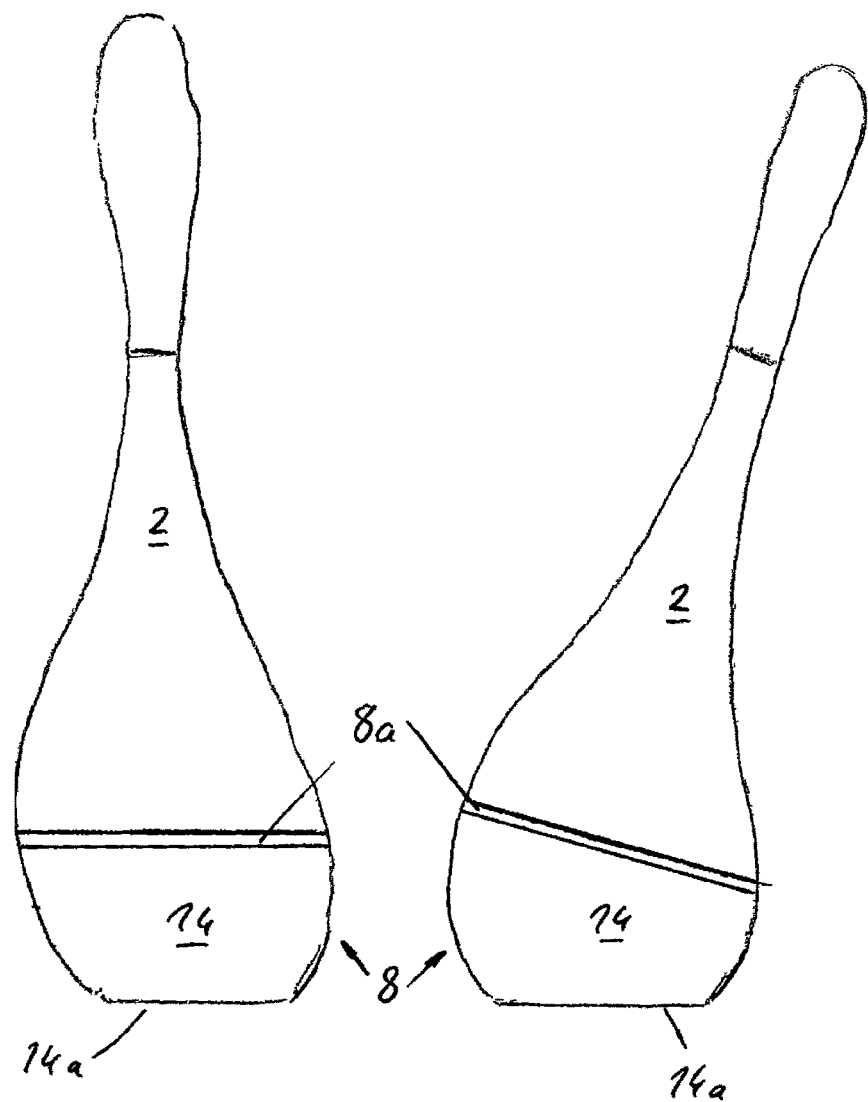

In the following, preferred exemplary embodiments of the invention are explained in greater detail based on the attached drawings. It shows:

FIG. 1 schematically in a transparent perspective side view an aroma granulate mill according to a first preferred exemplary embodiment;

FIG. 2 schematically in a perspective view diagonally from the top the aroma granulate mill of FIG. 1;

FIG. 3 schematically a detailed illustration of an attachment of the aroma granulate mill of FIG. 1 in a perspective view;

FIG. 4 schematically a detailed illustration of a preferred first variant of the attachment in a cross- section (FIG. 4a) and a preferred second variant of the attachment without an exterior thread in a side view (FIG. 4b);

FIG. 5 schematically a perspective illustration of a detail of the aroma granulate mill of FIG. 1 in an operating position;

FIG. 6 schematically a perspective illustration of a detail of the aroma granulate mill of FIG. 1 in a different operating position;

FIG. 7 schematically in a perspective side view the aroma granulate mill of FIG. 1 in an idle state;

FIG. 8 schematically in a side view an aroma granulate mill according to a second preferred embodiment of the invention; and FIG. 9 schematically in a side view an aroma granulate mill according to a third preferred embodiment of the invention.

The aroma granulate mill according to a first embodiment, shown in FIGS. 1 to 7, which is preferably used as a spice and/or salt or pepper mill, comprises a container 2, which in the exemplary embodiment shown is embodied as a rotary body. The container 2 is closed with a bottom 2a at its lower section as shown in FIGS. 1 and 2. The bottom 2a is embodied in the exemplary embodiment shown such that the container 2 can be securely placed with its bottom 2a onto an underground, not shown. As further discernible from the FIGS. 1 and 2 the container 2 shown comprises the form of a cone or cup slightly tapering towards the bottom 2a; of course, other shapes are generally possible for the container 2 as well.

The container 2 serves for accepting unground, coarse aroma granulate, such as salt or peppercorns, for example. In order to process them into fine-grained aroma granulate a grinder is provided, which is shown schematically in FIG. 1 and marked with the reference character "4". In the exemplary embodiment shown the grinder 4 is arranged in a section 2b of the container 2 at its attachment side, which is distanced from the bottom 2a and forms an upper section in the view of FIGS. 1 and 2. Here, a conventional grinder may be used as the grinder 4, which can be operated either electrically or manually. In the section 2b, in the view of FIGS. 1 and 2 at the attachment side, the container 2 is open and thus comprises an opening 6, which is limited by the section 2b at the attachment side. Accordingly the grinder 4 is arranged in the container 2 adjacent to its opening 6, as discernible from FIG. 1.

In the exemplary embodiment shown the container 2 can be closed at its opening 6 by an attachment, which is marked with the reference character "8" in the figures and which is shown in detail in FIG. 3, while in FIGS. 1, 2, 5, 6, and 7 the attachment 8 is shown in an assembled state at the section 2b at the attachment side and in a position closing it, and thus the container 2 is shown in a state closed by the attachment 8. As further discernible from FIGS. 1 and 3 the attachment 8 comprises a disk-shaped section 8a at the container side, with an external thread 10 being embodied thereat. In order to close the container 2 with the attachment 8 the external thread 10 of the attachment 8 is brought into a screw connection with an internal thread 12, which is embodied at the interior of the container 2 in the area of its opening 6 and thus the section 2b at the attachment side surrounding the opening 6, as indicated in FIG. 1. This way, in the exemplary embodiment shown the attachment 8 is screwed onto the container 2 to close it and is screwed off it in order to open the container 2 and here it is subjected to a respective rotary motion.

As discernible from the figures, the attachment 8 is further provided with a concave collar 14, which is arranged on the section 8a of the attachment 8 at the container side, projects therefrom and forms a cavity 16, which is open in a direction towards the outside in a section 8a of the attachment 8 at the container side. Thus, the collar 14 shows a free, circumferential side wall 14a, located distanced from the section 8a of the attachment 8 at the container side, which encloses an opening 18, accordingly also located distanced from the section 8a of the attachment 8 at the container side. In a section located deeper inside the cavity 16, which is located distanced from the circumferential side wall 14a and the opening 18 and adjacent and/or at the height of the section 8a of the attachment 8 at the container side, the collar 14 is provided with a dispensation opening 20, with in the exemplary embodiment shown the dispensation opening 20 being arranged in the lowermost located section 14b of the collar 14. The dispensation opening 20 is embodied as a penetrating opening, and thus it is open not only towards the cavity 16 but also at the opposite exterior and/or bottom of the section 8a of the attachment 8 at the container side. Here, the arrangement of the dispensation opening 20 in the collar 14 of the attachment 8 and the outlet of the grinder 4 (FIG. 1) is embodied such that when the attachment 8 is placed on the container 2 its dispensation opening 20 is aligned with the outlet of the grinder, which is schematically shown in FIG. 2 and marked with the reference character "22".

As particularly discernible from the FIGS. 1 and 3, in the exemplary embodiment shown, the collar 14 shows approximately the form of a hemispheric cup. In general, other shapes are also possible if they form a curvature or bulging inwardly in the direction to the section 8a of the attachment 8 at the container side and/or towards the container 2. Similar to the container 2, in the exemplary embodiment shown the attachment 8 with its container-side section 8a is formed as a rotary body as well, with its axis of rotation and/or central axis X being shown as an example in FIG. 4b. As further discernible from FIG. 3 in connection with FIG. 4b the circumferential side wall 14a of the collar 14 is located in a level, which extends inclined in reference to the central axis X. Accordingly the level stretched by the clear circumferential side wall 14a of the concave collar 14 extends at an angle and thus inclined in reference to the disk-shaped section 8a of the attachment 8 at the container side. This way an asymmetrical and/or uneven shape develops with a section 14aa located farthest away and/or "highest" in reference to the circumferential side wall 14a of the section 8a of the attachment 8, in the exemplary embodiment shown causing the concave collar 14 generating the impression of an inclined cup, open towards the top.

FIGS. 4a and b show preferred modifications of the attachment 8, which differ from the embodiment of the attachment 8 shown in FIGS. 1 to 3 and 5 to 7 such that the circumferential side wall 14a of the collar 14 defines an opening 18, with its cross-sectional area being smaller than the cross-sectional area of the cavity 16 at the widest section within the concave collar 14. Thus, based on the partially spherical form used in the exemplary embodiment shown for the concave collar 14, the diameter $d_0$ of the opening 18 is smaller than the diameter $d_{max}$ at the widest point of the cavity 16, as discernible from FIG. 4a.

If the grinder 4 (FIG. 1) can be manually operated, it should preferably show a mobile operating section, not shown in the figures, with its motion setting the grinder 4 into the milling operation. Here, the operating section of the grinder 4 shall be supported in a mobile fashion such that it performs a movement along a partially or entirely circular path. Furthermore, beneficially the grinder 4 should be embodied such that during the movement of the above-mentioned operating section in both directions the grinding operation is respectively activated. In order to move the above-mentioned operating section for the purpose of activating the grinder 4 preferably a rotary motion of the attachment 8 can be used in reference to the container 2. For this purpose, the attachment 8 at the exterior and/or bottom of its section 8a at the container side, pointing to the container 2, is provided with an engagement section 24, which in the exemplary embodiment shown according to FIG. 3c is indicated as a pin-shaped tappet projecting downwardly. Here, the engagement section 24 is embodied such that it engages the grinder 4 with the operating section, not shown, and entrains it on a circular path, resulting in the grinder 4 performing the milling operation. For this purpose, the section 8a of the attachment 8 at the container side is embodied without an external thread in the preferred second variant shown in FIG. 4b and is simply plugged into the opening 6 in the section 2b of the container 2 (FIG. 1) at the attachment side, allowing the engagement section 24 at the bottom of the attachment 8 to engage the operating section of the grinder 4, not shown. For the use of the second variant of the attachment 8 according to FIG. 4b the interior wall of the section 2b of the container 2 at the attachment side should also be embodied without an internal thread; instead, for the fixation of the attachment 8 at the container 2 locking means, which can be made to engage each other in a detachable fashion, may be embodied corresponding at the internal wall of the section 2b of the container 2 at the container side and at the external wall of the section 8a of the attachment 8 at the container side. In order to yield a rotary motion of the attachment 8 in reference to the container 2 and thus a motion of the engagement section 24 in reference to the grinder 4 for example the engagement section 24 at the collar 14 can be arranged stationary in reference thereto and the collar 14 can be arranged rotational about the axis of rotation and/or the central axis X at the section 8a of the attachment 8 at the container side.

Instead of the embodiment shown in FIG. 1, it is for example also possible to provide the grinder 4 in the attachment 8 and particularly in its section 8a of the attachment 8 at the container side, and by a rotary motion of the collar 14 to operate it in reference to the section 8a at the container side.

Further, here it shall be mentioned for reasons of completeness, that contrary to the first embodiment described based on FIGS. 1 to 7, alternatively for example the operation of the grinder 4 can also occur from the side of the bottom 2a of the container, with here for example an appropriate operating element being provided, for example in the form of a rotary knob. By the activation of the grinder 4 (FIG. 1), in the exemplary embodiment shown not only the coarse aroma granulate located in the container 2 is processed into fine-grained aroma granulate, but it is also simultaneously dispensed out of the outlet 22 of the grinder 4 and the dispensation opening 20 in the collar 14. Here, the ground material comprising fine-grained aroma granulate reaches the cavity 16 of the collar 14 and is collected here. It is advantageous here to hold the container 2 with the attachment 8 and/or the collar 14 slightly inclined downwards, as schematically indicated in FIGS. 4 and 5. In the example shown in FIGS. 5 and 6 the aroma granulate mill is held by a user, not shown, such that the ground material marked "26" collects in the area of the widest wall section 14ba of the collar 14, seen in the longitudinal direction of the container 2 the highest one, (with the section 14aa of the circumferential side wall 14a located farthest from the container 2 and the section 8a of the attachment 8 at the container side). This is possible by the above-described asymmetrical and/or uneven design of the concave collar 14, which therefore offers a relatively large accepting area in the proximity of the wide section 14ba. For an optimal collection of the ground material 26 dispensed from the dispensation opening 20 into the collar 14 and for the subsequent optimal discharge of the ground material, as schematically indicated in FIG. 5 based on the reference character "28", the concave collar 14 in the alignment shown in FIGS. 5 and 6 should be held with the section 14ba pointing downwards. During the milling process therefore the user should hold the attachment 8 with his/her hand in an essentially stationary fashion and with his/her other hand rotate the container 2 in reference to the attachment 8, as indicated in FIG. 5 by the double arrow marked "Y". The subset 28, shown schematically in FIG. 6, of the ground material 26 collected in the cavity 16 of the collar 14 can particularly be dispensed from the collar 14 such that it is subjected to slight vibrations in order to this way the ground material 26 becoming fluid.

After use, the aroma granulate mill can be placed with the bottom 2a of the container 2 onto an underground, not shown, in the FIGS. 1 and 2 showing an alignment with the attachment 8 being at the top. This way any potentially excess quantity of ground material 26 can be returned back into the container 2 through the dispensation opening 20, if necessary, with here for this purpose the concave collar 14 potentially being impinged with slight vibrations in order to this way the ground material 26 becoming fluid.

Alternatively the embodiment shown allows also a placement quasi upside down, as shown in FIG. 7. Here, the aroma granulate mill is placed with the collar 14 onto an underground, not shown in the figures, either. This is particularly possible in that, as described above, the free circumferential side wall 14a of the concave collar 14 is essentially located in one level, which is particularly advantageous for an arrangement on a planar underground. Due to the fact that in the exemplary embodiment shown the level stretched by the circumferential side wall 14a is not oriented perpendicular in reference to the axis of rotation and/or the central axis X (FIG. 4b) of the attachment 8 but inclined and/or tilted in reference thereto, the container 2 assumes a slightly inclined position in the exemplary embodiment shown, as further discernible from FIG. 7. Alternatively it is also possible of course to embody the concave collar 14 in a rotary symmetrical fashion, by orienting the level stretched by the circumferential side wall 14a perpendicular in reference to the axis of rotation and/or central axis X; in such a case then the container 2 would be placed with the collar 14 on an underground, quasi upside down.

In the exemplary embodiment described above based on FIGS. 1 to 3 the cavity formed by the concave collar 14 shows its larges cross-section in the area of the opening 18 surrounded by the free circumferential side wall 14a of the collar 14 and thus defined thereby. As already described above in the variants shown on FIGS. 4a and b preferably the circumferential side wall 14a of the collar 14 defines an opening 18, with its area being smaller than the cross-section of the opening of the cavity at its widest section within the concave collar 14. Such a design also shows a concave collar 14 in the second embodiment illustrated in FIG. 8 and in the third embodiment of an aroma granulate mill shown in FIG. 9. As discernible from these two figures, the concave collar 14 in these two embodiments is provided with a bulging design, in which it initially widens with increasing distance from the container 2 and subsequently tapers again towards the circumferential side wall 14a.

As further discernible from a comparison of the FIGS. 8 and 9 with the FIGS. 1 to 7 the second embodiment and the third embodiment differ from the first embodiment such that the container 2 shows a curved shape like an upside down vase with a relatively narrow rod-shaped end distanced from the attachment 8 so that the container 2 of the second and third embodiments cannot be placed onto an underground with the attachment pointing upwards. Rather the design of the second and third embodiment only allows a placement upside down in the alignment shown in FIGS. 8 and 9.

The essential difference between the second embodiment and the third embodiment is given in the aroma granulate mill of the second embodiment according to FIG. 8 essentially being designed in a rotationally symmetrical fashion such that the clear circumferential side wall 14a of the collar 14 stretches a level oriented perpendicular in reference to the axis of rotation and/or central axis, not shown, of the aroma granulate mill and this way causes an upright arrangement during the placement onto an underground. In this context it shall be mentioned for clarity reasons that FIG. 8, based on the sketched illustration, perhaps fails to clearly disclose the rotationally symmetric design of the aroma granulate mill illustrated here, however actually it is designed in a rotationally symmetrical fashion. Contrary thereto, in the third embodiment according to FIG. 9 the level stretched by the circumferential side wall 14a of the collar 14 is inclined in reference to the axis of rotation and/or the central axis, not shown, of the aroma granulate mill so that it can be arranged on the circumferential side wall 14a of its collar 14 in an inclined position on an underground, as shown for example in FIG. 9. This difference between the second embodiment and the third embodiment is further disclosed by the fact that the level, stretched by the clear circumferential side wall 14a of the collar 14, is arranged in reference to the disk-shaped section 8a at the container side, by which the attachment 8 is arranged at the container 2, extends essentially parallel in the second embodiment according to FIG. 8 and inclined in the third embodiment according to FIG. 9. Finally, a lid, not shown in the figures, may also be used, which is embodied to close the opening 18 of the cavity 16 of the collar 14 and/or the dispensation opening 20 within the cavity 16 of the collar 14.

The invention claimed is:

1. An aroma granulate mill for the dispensation of ground aroma granulate comprising:
   a container for accepting unground, coarse aroma granulate;
   an element provided at the container and showing a dispensation opening for dispensing ground, fine-grained aroma granulate from the container; and
   a grinder arranged upstream in reference to the dispensation opening for milling the unground, coarse aroma granulate into ground, fine-grained aroma granulate, wherein the element comprising the dispensation opening shows a concave collar, which forms a cavity open towards the outside, which is limited by a circumferential side wall and shows at least one section recessed in the direction towards the container opposite the circumferential side wall, in which the dispensation opening is arranged, with the circumferential side wall defining an opening, with its area being smaller than the cross-section of the opening of the cavity at its widest section, and wherein the container comprises an opening, on which an attachment is placeable, which is formed by the element comprising the dispensation opening.

2. An aroma granulate mill according to claim 1, wherein the circumferential side wall is located in one level.

3. An aroma granulate mill according to claim 2, wherein the level is arranged inclined in reference to the container.

4. An aroma granulate mill according to claim 3, wherein the container is embodied as a rotary body, and wherein the level is arranged inclined in reference to the axis of rotation and/or the central axis (X) of the rotary body.

5. An aroma granulate mill according to claim 1, wherein the concave collar shows a partially spherical or partially parabolic form.

6. An aroma granulate mill according to claim 1, wherein the concave collar shows the form of a cup facing away from the container.

7. An aroma granulate mill according to claim 6, in which the grinder comprises a mobile operating section configured to be set into the milling operation by moving said operating section, wherein the attachment comprises an engagement section, which is configured to engage the operating section of the grinder to set in motion the operating section of the grinder by a relative motion between the container and the attachment.

8. An aroma granulate mill according to claim 1, wherein the grinder is arranged in the area of the opening of the container and is configured to generate a connection between the outlet of the grinder and the dispensation opening when the attachment is placed on the opening of the container.

9. An aroma granulate mill according to claim 1, in which the grinder comprises a mobile operating section configured to be set into the milling operation by moving said operating section, wherein the attachment comprises an engagement section configured to engage the operating section of the grinder to set in motion the operating section of the grinder by a relative motion between the container and the attachment.

10. An aroma granulate mill according to claim 9, in which the operating section of the grinder and the attachment are supported in a rotary fashion, wherein during a relative rotary motion between the container and the attachment the engagement section is subjected to a motion in a circular path to transfer a relative rotary motion of the attachment in reference to the container to the operating section of the grinder.

11. An aroma granulate mill according to claim 10, wherein the grinder is configured to be set into the milling operation by a respective rotation of its operating section in both directions (Y).

12. An aroma granulate mill according to claim 10, wherein the attachment is configured to coincide the axis of rotation (X) of the attachment with the axis of rotation of the operating section of the grinder when the attachment is arranged on or in the opening of the container.

13. An aroma granulate mill according to claim 10, wherein the grinder comprises an operating section supported rotationally or mobile along a circular path and configured to be set into the milling operation by moving this operating section, wherein the collar is rotationally supported at a section of the attachment and shows an engagement section, which is configured to engage the operating section of the grinder to subject the engagement section to a motion along a circular path to transfer this relative rotary motion to the operating section of the grinder during a relative rotary motion between the collar and the section of the attachment.

14. An aroma granulate mill according to claim 1, wherein the grinder is arranged at or in the attachment.

15. An aroma granulate mill according to claim 14, wherein the collar is supported rotationally at a section of the attachment and is coupled to the grinder to set the grinder into the milling operation by a relative rotary motion between the collar and the other section of the attachment.

16. An aroma granulate mill according to claim 1, wherein the cavity is configured to be closed with a lid.

17. An aroma granulate mill according to claim 1, wherein the dispensation opening is configured to be closed with a lid.

18. An aroma granulate mill according to claim 1, wherein the container is embodied as a rotary body, wherein the axis of rotation of the operating section of the grinder coincides with the axis of rotation and/or central axis of the rotary body.

19. An aroma granulate mill according to claim 1, wherein the container comprises a bottom arranged distanced from the concave collar and configured to be placed on an underground.

* * * * *